Patented Feb. 16, 1943

2,311,259

UNITED STATES PATENT OFFICE 2,311,259

PLASTIC COMPOSITION

Charles E. Staff and William N. Stoops, Charleston, W. Va., assignors to Carbide and Carbon Chemicals Corporation, a corporation of New York No Drawing. Application June 8, 1940, Serial No. 339,490

9 Claims. (Cl. 260—36)

This invention relates to plastic compositions composed of vinyl resins which have been either partially softened or transformed to solid colloidal dispersions by their incorporation with appropriate amounts of certain novel, high-boiling plasticizers. The invention includes certain of these plasticizers as new chemical compounds.

These plasticizers or softening agents are composed of diesters formed by reacting the acidic adducts of hydrocarbons having conjugated double bonds and maleic acid or anhydride, or their derivatives, with an aliphatic acyclic alcohol having at least six carbon atoms. The formation of the acidic adducts is described in the Diels and Alder Patent 1,944,731 and examples of hydrocarbons having conjugated double bond systems, which are especially useful as intermediates in the formation of the new ester plasticizers, are cyclopentadiene, butadiene, isoprene, cyclohexadiene, and piperylene. The reaction of hydrocarbons of this type with maleic acid or anhydride, or their derivatives, gives rise to tetrahydrophthalic acid, in the case of butadiene, and, in the case of the other hydrocarbons mentioned, to derivatives of tetrahydrophthalic acid or its anhydride. These derivatives will be endo-alkylene substituted or alkyl substituted, depending on whether the hydrocarbon involved is cyclic or acyclic in its structure. The acids thus formed may be esterified with the aforesaid alcohols, or in some cases, they may be hydrogenated to hexahydrophthalic acid, or to derivatives of hexahydrophthalic acid, either before or after esterification.

Typical of the aliphatic alcohols which may be employed in forming the new esters are hexanol, cyclohexanol, 2-ethyl butanol, methyl isobutyl carbinol, methyl amyl carbinol, 2-propyl butanol, octanol, 2-ethyl hexanol, lauryl alcohol, undecanol, and stearyl alcohol.

Esterification of the acidic adducts with the foregoing group of alcohols may be carried out at temperatures ranging from 50° C. to 300° C. and, if desired, in the presence of suitable catalysts, such as sulfuric acid. The water formed during esterification may be removed continuously as an azeotropic mixture by distillation with benzene, xylene, or toluene.

Vinyl resins from which the plastic compositions may be derived are those which may be formed by the polymerization or condensation of vinyl compounds, such as vinyl acetate, vinyl propionate, vinyl butyrate, vinyl chloride, vinyl bromide, or vinyl benzene (styrene). Polyvinyl acetal resins, which may be formed by the partial or complete reaction of aldehydes with polyvinyl alcohol or incompletely hydrolyzed polyvinyl esters, are also included within the group of vinyl resins. A particularly desirable type of vinyl resin for use in the invention is that which may be formed by the conjoint polymerization of vinyl halides with vinyl esters of aliphatic acids.

The plastic compositions are valuable for various applications and, depending on the use involved, the selection of vinyl resins with special characteristics is indicated. If the plastic composition is intended for use in lacquers from which it is deposited, upon drying or baking, as a protective, ornamental or electrically insulating coating in the form of a flexible and tough film, the following vinyl resins are preferred:

(a) Polyvinyl acetal resins formed by the condensation of aldehydes with polyvinyl alcohol.

(b) Conjoint polymers of vinyl chloride with vinyl acetate, having an average macromolecular weight of from 8,000 to 12,000, and having a vinyl chloride content of from 80% to 90% by weight.

If colloidal, homogeneous solid dispersions of the vinyl resins and the plasticizers are to be prepared, the use of highly polymerized, insoluble polyvinyl halides, or of conjoint polymers of vinyl chloride with vinyl acetate having average macromolecular weights in excess of 12,000, and having vinyl chloride contents ranging from 85% to 95% by weight is desirable. Such dispersions are strong and resilient and provide highly serviceable substitutes for leather or for rubber and their durable characteristics qualify them for use in cable insulation. Such dispersions may be prepared by working an amount of the plasticizer from about 20% to about 50% by weight of the plastic composition with the resins on a heated rubber mill until a homogeneous colloidal dispersion is obtained.

As contrasted with known plasticizers, such as the lower aliphatic esters of derivatives of tetrahydrophthalic acid, the new esters, when incorporated in plastic compositions of the type just described, provide the advantages of greater strength at elevated temperatures and of greater flexibility at extremely low temperatures of around −15° C. This latter effect is unusual in view of the fact that long chain aliphatic radicals in chemical compounds normally tend to cause a very rapid increase in the consistency of the compound with decrease in temperature.

EXAMPLE 1.—*Dihexyl ester of endo-methylene tetrahydrophthalic anhydride*

In a still equipped with a decanter for removal of water, 200 grams of endo-methylene tetrahydrophthalic anhydride were esterified with 400 grams of normal hexanol in the presence of 1 gram of toluene sulfonic acid as an esterification catalyst and in the presence of 200 cc. of benzene as an agent for removal of water by an azeotropic distillation. The diester was recovered as a water-white liquid having a boiling point of 189° C. at 6 mm.

EXAMPLE 2.—*Di(2-ethylhexyl) ester of endo-methylene tetrahydrophthalic anhydride*

This ester was prepared by heating 200 grams of endo-methylene tetrahydrophthalic anhydride with 400 grams of 2-ethylhexanol in the presence of 1 gram of toluene sulfonic acid as a catalyst and 200 cc. of benzene to assist in the removal of the water of esterification by means of an azeotropic distillation.

The same ester was also prepared by means of the diene synthesis by reacting 2,000 grams of di(2-ethylhexyl) maleate with 345 grams of cyclopentadiene at a temperature between 40° and 55° C.

In either case, the new ester was recovered as a water-white liquid having a boiling point of 190° to 191° C. at 2.5 mm. The new ester possessed exceptional qualities as a plasticizer for vinyl resins and this will be demonstrated by the examples to follow.

EXAMPLE 3.—*Plastic composition*

Sixty-eight parts by weight of a highly polymerized vinyl resin formed by the conjoint polymerization of vinyl chloride with vinyl acetate, containing about 90% by weight vinyl chloride in the polymer and having an average macromolecular weight over 18,000 as determined by Staudinger's method, were combined with 32 parts by weight of the plasticizer identified in the preceding example. This was done by working the two ingredients on a rubber mill at a temperature of about 110° C. until a clear homogeneous sheet was formed. This plastic composition possessed the unusual property of being flexible at −15° C. yet retained its toughness, strength and resilience at temperatures of around 80° C. At room temperature, its tensile strength was 3390 pounds per square inch and its elongation before rupture was 300%, which indicates the suitability of the material as a flexible electric insulation for cables, wires, and the like.

When 65 parts by weight of the same resin were combined with 35 parts by weight of dibutyl endo-methylene tetrahydrophthalate, a lower aliphatic ester of endo-methylene tetrahydrophthalic anhydride, it was found that the plastic composition thus formed possessed inferior qualities to those of the one just described. For instance, despite the somewhat greater amount of plasticizer, this composition had no greater flexibility at low temperatures of around −15° C. and was distinctly softer and of less strength and toughness at elevated temperatures of around 80° C.

EXAMPLE 4.—*Plastic composition*

When 65 parts by weight of a highly polymerized, relatively insoluble, polyvinyl chloride were combined with 35 parts of di(2-ethylhexyl) endo-methylene tetrahydrophthalate, it was found that a flexible, resilient and tough plastic composition was formed. This product is likewise useful for electrical insulation.

EXAMPLE 5.—*Di(2-ethylhexyl) ester of endo-methylene hexahydrophthalic anhydride*

This ester was prepared by heating 900 grams of endo-methylene hexahydrophthalic anhydride with 1500 grams of 2-ethyl hexanol in the presence of 4 grams of sulfuric acid. The removal of water formed in the reaction was carried out by an azeotropic distillation in the presence of 200 cc. of toluene. The new ester was recovered as a water-white liquid having a boiling point of 212° C. at 2 mm. It possessed excellent qualities as a plasticizer as shown by the following example.

EXAMPLE 6.—*Plastic composition*

When 68 parts by weight of the conjoint polymer identified in Example 3 were combined with 32 parts by weight of the saturated ester described in the preceding example, a plastic composition having excellent properties of strength, toughness and flexibility was obtained. Thus, its tensile strength at room temperature was 3490 pounds per square inch and its elongation before rupture was 300%. When 65 parts of highly polymerized polyvinyl chloride were combined with 35 parts by weight of the same saturated ester a plastic composition of similar properties was obtained. Thus, its tensile strength was 3040 pounds per square inch and its elongation before rupture was 190%.

EXAMPLE 7.—*Di(2-ethylhexyl) ester of methyl tetrahydrophthalic anhydride*

Nine hundred grams of methyl tetrahydrophthalic anhydride, formed by the condensation of maleic anhydride with isoprene, were esterified with 1500 grams of 2-ethyl hexanol in the presence of 4 grams of sulfuric acid and 200 cc. of toluene for azeotropic removal of the water of reaction. The new ester was a water-white liquid having a boiling point of 204° C. at 2 mm.

EXAMPLE 8.—*Di(2-ethylhexyl) ester of methyl hexahydrophthalic anhydride*

This ester was prepared by heating 900 grams of methyl hexahydrophthalic anhydride with 1500 grams of 2-ethyl hexanol in the presence of 4 grams of sulfuric acid and 200 cc. of toluene. It was recovered as a liquid having a boiling point of 210° C. at 2 mm.

EXAMPLE 9.—*Plastic composition*

Both the saturated and unsaturated esters described in the two previous examples were excellent plasticizers. For instance, when 65 parts by weight of a highly polymerized polyvinyl chloride resin were combined with 35 parts by weight of the unsaturated ester a strong and tough plastic composition was obtained. It had a tensile strength of 3090 pounds per square inch and an elongation before rupture of 220%.

EXAMPLE 10.—*Dilauryl ester of endo-methylene tetrahydrophthalic anhydride*

This ester was prepared by heating 200 grams of endo-methylene tetrahydrophthalic anhydride with 550 grams of lauryl alcohol in the presence of a catalyst composed of 5 grams of sulfuric acid. Water was removed by distillation with 200 cc. of toluene. The ester was recovered as a light yellow liquid after the excess alcohol and toluene were distilled off. This compound is somewhat less valuable as a plasticizer than the corresponding ester of 2-ethylhexyl alcohol.

EXAMPLE 11.—*Di-undecyl ester of endo-methylene tetrahydrophthalic anhydride*

This ester was made by heating 320 grams of endo-methylene tetrahydrophthalic anhydride with 840 grams of undecanol-2 in the presence of 5 grams of toluene sulfonic acid as a catalyst and 300 cc. of toluene. The rate of reaction was slow. The ester was recovered as a light yellow residue after distilling off the excess alcohol and toluene.

EXAMPLE 12.—*Di(dicrotonol) ester of endomethylene tetrahydrophthalic anhydride*

This ester was prepared by heating 982 grams of dicrotonol with 525 grams of endo-methylene tetrahydrophthalic anhydride in the presence of 3 grams of sulfuric acid and 200 cc. of toluene. The reaction time was 16 hours and the reaction temperature was 150° to 154° C. The product was recovered as a residue in the form of a brown viscous liquid having a saponification equivalent of 219, corresponding closely to the theoretical value of 217. The ester was found to be an excellent plasticizer for the vinyl resins.

The esters identified in the foregoing examples are, for the most part, new chemical compounds. As such, they, as well as other subject matter divided from the present application, are claimed in C. E. Staff applications Serial Nos. 415,632 and 415,633, filed October 18, 1941. A preferred class of plasticizers are those which are composed of the diesters of aliphatic alcohols having at least six carbon atoms with acidic adducts of unsaturated conjugated hydrocarbons having from four to five carbon atoms and maleic acid and anhydride, or the hydrogenated derivatives of these compounds.

Modifications of the invention other than as described will be apparent to those skilled in the art and the scope of the invention is limited only by the appended claims.

We claim:

1. A plastic composition comprising a vinyl resin and a plasticizer, said plasticizer being di(2-ethylhexyl) endo-methylene tetrahydrophthalate.

2. A plastic composition comprising a vinyl resin and a plasticizer, said plasticizer being di(2-ethylhexyl) endo-methylene hexahydrophthalate.

3. A plastic composition comprising a vinyl resin and a plasticizer, said plasticizer being di(2-ethylhexyl) methyl hexahydrophthalate.

4. A plastic composition comprising a vinyl resin and a plasticizer, said plasticizer being a diester of an aliphatic acyclic alcohol having at least six carbon atoms with endo-methylene tetrahydrophthalic acid.

5. A plastic composition comprising a vinyl resin and a plasticizer, said plasticizer being a diester of an aliphatic acyclic alcohol having at least six carbon atoms with endo-methylene hexahydrophthalic acid.

6. A plastic composition comprising a vinyl resin and a plasticizer, said plasticizer being a diester of a substituted hydrophthalic acid of the group consisting of alkyl and endo-alkylene substituted tetra- and hexahydrophthalic acids, with an aliphatic acyclic alcohol having at least six carbon atoms, said plastic composition being capable of forming flexible films at low temperatures.

7. A plastic composition comprising a vinyl resin which is a conjoint polymer of vinyl chloride with vinyl acetate having an average macromolecular weight above 12,000 and having a vinyl chloride content of from about 85% to about 95% by weight, and a plasticizer; said plasticizer being a diester of a substituted hydrophthalic acid of the group consisting of alkyl and endo-alkylene substituted tetra- and hexahydrophthalic acids, with an aliphatic acyclic alcohol having at least six carbon atoms, said plastic composition being capable of forming flexible films at low temperatures.

8. A plastic composition comprising a vinyl resin and a plasticizer, said plasticizer being a diester of 2-ethylhexyl alcohol with an acidic adduct of an unsaturated conjugated hydrocarbon having from four to five carbon atoms and maleic anhydride, said plastic composition being capable of forming flexible films at low temperatures.

9. A plastic composition comprising a vinyl resin and a plasticizer, said plasticizer being a completely hydrogenated diester of 2-ethylhexyl alcohol with an acidic adduct of an unsaturated conjugated hydrocarbon having from four to five carbon atoms and maleic anhydride, said plastic composition being capable of forming flexible films at low temperatures.

CHARLES E. STAFF.
WILLIAM N. STOOPS.